Nov. 8, 1927.  
E. F. PEVERE ET AL  
1,648,146  
PROCESS OF PURIFYING PHOSPHORIC ACID  
Filed Nov. 5, 1926
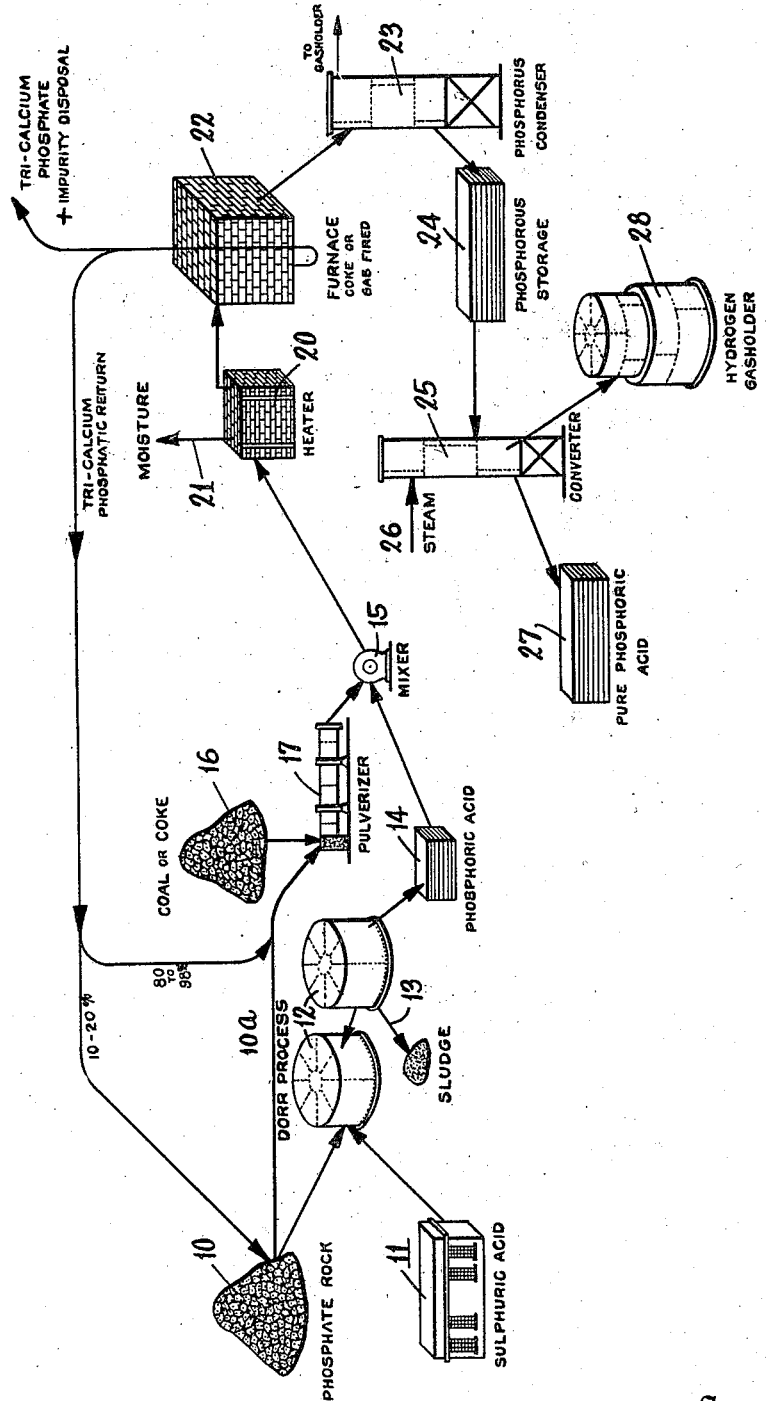

Patented Nov. 8, 1927.

1,648,146

UNITED STATES PATENT OFFICE.

ERNEST F. PEVERE AND GEORGE A. HENDRIE, OF NIAGARA FALLS, NEW YORK, ASSIGNORS TO PHOSPHORUS HYDROGEN COMPANY, OF NEW YORK, N. Y., A CORPORATION OF MAINE.

PROCESS OF PURIFYING PHOSPHORIC ACID.

Application filed November 5, 1926. Serial No. 146,312.

The present invention relates to improvements in processes and apparatus for purifying phosphoric acid.

The present application constitutes an improvement of the application of George A. Hendrie, Serial No. 133,111, filed September 2, 1926. As in the Hendrie application above referred to, the process contemplates the purification of comparatively impure phosphoric acid produced by treating phosphoric rock with sulphuric acid which process is generally known as the wet or Dorr process. The raw phosphoric acid as produced by the Dorr process contains a number of impurities including iron and aluminum compounds.

The present invention is directed to an improved method for cheapening the purification process heretofore used for refining the raw phosphoric acid used as a result of the wet process.

The drawings show a diagrammatic illustration of the process and apparatus.

Referring to the drawings, 10 designates a supply of phosphate rock which is one of the raw materials used. Sulphuric acid can be produced in any well known manner as by the apparatus generally designated at 11. The sulphuric acid and phosphate rock are then treated in the Dorr mixer generally designated at 12 from which sludge is removed from time to time as indicated at 13. Impure phosphoric acid is then collected at 14 and passes to a mixer at 15. Carbonaceous material in the form of coal or coke is supplied from a supply 16 to a pulverizer 17. Crude phosphate rock is also supplied from 10 as indicated at 10ª to the pulverizer 17 and this phosphate rock is there ground up with the coal or coke and admitted to the mixer 15. In this mixer the phosphate rock re-acts and combines with the crude phosphoric acid to form mono-calcium phosphate and from the mixer 15 the mono-calcium phosphate thus produced together with the coal or coke is passed to a heater or dryer 20. In this heater, moisture is driven off as indicated at 21 and the mono-calcium phosphate is converted to a calcium metaphosphate. From dryer 20 the calcium metaphosphate and the pulverized coal or coke is admitted to a retort furnace 22. In this retort furnace the calcium metaphosphate re-acts with the carbon as follows:

$$3Ca(PO_3)_2 + 10C = Ca_3(PO_4)_2 + P_4 + 10\ CO$$

The phosphorus is evolved in the form of a gas with the carbon monoxide and these gases pass to a phosphorus condenser 23. The uncondensed gases of carbon monoxide can be led to a suitable gas holder (not shown) and these gases having considerable heating value can be utilized for heating the dryer 20 and the furnace 22. From time to time, the phosphorus is tapped off from the phosphorus condenser 23 and lead into the phosphorus storage reservoir 24. It is desired that a considerable storage capacity be provided for the phosphorus as the succeeding apparatus consumes the phosphorus at a rapid rate and it is desired that sufficient storage be provided to permit considerable collection to be obtained. If desired, a number of phosphorus producing units can be used as with a single phosphorus storage tank and with a single phosphorus coverting unit. The phosphorus from the storage reservoir 24 is admitted into a converter 25 receiving steam at 26 and converting the phosphorus into commercially pure phosphoric acid which is discharged into a collecting chamber 27. The hydrogen evolved may be collected in a suitable hydrogen gas holder 28.

It will be understood that the re-action taking place in the converter 25 is that described in the Liljenroth Patent #1,594,372, dated August 3, 1926. As previously stated, the retort furnace 22 converts the calcium metaphosphate into tri-calcium phosphate. In this conversion the various undesirable impurities including the objectionable iron and aluminum compounds remain with the tri-calcium phosphate and when the re-action is complete this tri-calcium phosphate from the furnace 22 is returned in part to the phosphate rock supply pile 10 and in part direct to the pulverizer 17. In practice from 10 to 20 per cent of the tri-calcium phosphate with the impurities can be returned to the pile 10, and 80 to 90 per cent can be admitted to the pulverizer 17. The tri-calcium phosphate can thus be again used in the process. As the process is continued, the impurities which are removed from the raw phosphoric acid will gradually increase in this tri-calcium phosphate formed by the retort furnace 22 and we therefore, contemplate the removal of this impure tri-calcium phosphate at times. Such removal can be effected either continually, a certain percentage being removed for each operation cycle, or preferably an entire charge of tri-calcium phosphate can be removed and disposed of and not readmitted to the initial steps of the process.

In practice it will be found that after the process is continued for a certain time with the tri-calcium phosphate returned and reused, that this tri-calcium phosphate will contain a considerable percentage of iron phosphide and such iron phosphide can be separated out from the tri-calcium phosphate in any desired manner and separately disposed of.

By the above process the crude phosphoric acid can be refined and purified and freed of the objectional iron and aluminum impurities. The phosphoric acid produced by the converter is commercially pure and is secured at a relatively lower cost than heretofore. The impurities are withdrawn with the tri-calcium phosphate and when the iron phosphide content has increased to a sufficient point to warrant separation and recovery other material can be separated out and separately disposed of, thus affording a valuable by-product which reduces the operation costs correspondingly.

What we claim is:

1. The process of purifying crude phosphoric acid which comprises mixing impure acid with carbonaceous material and phosphate rock, effecting a conversion of the tri-calcium phosphate into mono-calcium phosphate and then into calcium metaphosphate, heating the mixture to form phosphorus and leave with the tri-calcium phosphate the impurities initially present in the phosphoric acid, converting the phosphorus into commercially pure phosphoric acid, and returning and recovering the tri-calcium phosphate in the initial steps of the process and in removing the accumulated impurities by a removal of the tri-calcium phosphate after the heating step.

2. The process of purifying crude phosphoric acid which comprises mixing the impure acid with carbonaceous material and phosphate rock, converting the tri-calcium phosphate into mono-calcium phosphate, subsequently converting the mono-calcium phosphate into calcium metaphosphate, heating the mixture to effect a conversion of the mono-calcium phosphate into tri-calcium phosphate with the evolution of phosphorus, converting the phosphorus into commercially pure phosphorous pentoxide and withdrawing the impurities with the tri-calcium phosphate which is produced by the aforesaid heating step.

3. The process of purifying crude phosphoric acid which comprises mixing impure acid with carbonaceous material and phosphate rock, effecting the conversion of the tri-calcium phosphate into mono and the calcium metaphosphate, and subsequently heating the mixture to form tri-calcium phosphate and to evolve phosphorus which is available for conversion into commercially pure phosphorous pentoxide, returning the tri-calcium phosphate to the initial steps of the process and in withdrawing tri-calcium phosphate after the heating step when they carry the collected impurities which were initially present with the crude phosphoric acid.

In testimony whereof we hereto affix our signatures.

ERNEST F. PEVERE.
GEORGE A. HENDRIE.